United States Patent
Lin et al.

(10) Patent No.: US 10,666,566 B2
(45) Date of Patent: May 26, 2020

(54) NETWORK TRAFFIC CONTROL DEVICE AND SYSTEM

(71) Applicant: REALTEK SEMICONDUCTOR CORPORATION, Hsinchu (TW)

(72) Inventors: Meng-Ju Lin, Taoyuan (TW); Yu-Kuen Wu, Miaoli County (TW); Tzu-Yun Yeh, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/180,557

(22) Filed: Nov. 5, 2018

(65) Prior Publication Data
US 2019/0140959 A1 May 9, 2019

(30) Foreign Application Priority Data
Nov. 6, 2017 (TW) .................................. 106138326

(51) Int. Cl.
*G06F 11/00* (2006.01)
*H04L 12/851* (2013.01)
*H04L 12/801* (2013.01)

(52) U.S. Cl.
CPC .............. *H04L 47/24* (2013.01); *H04L 47/12* (2013.01)

(58) Field of Classification Search
CPC ............................... H04L 47/24; H04L 47/12
USPC ....................................... 370/252, 254, 253
See application file for complete search history.

(56) References Cited

U.S. PATENT DOCUMENTS

| | | | |
|---|---|---|---|
| 2004/0230444 A1* | 11/2004 | Holt | G07F 17/32 370/329 |
| 2013/0051331 A1 | 2/2013 | Bao et al. | |
| 2015/0277990 A1* | 10/2015 | Xiong | G06F 9/52 718/106 |
| 2016/0234099 A1* | 8/2016 | Jiao | H04L 45/02 |
| 2017/0054776 A1* | 2/2017 | Dao | H04L 65/1089 |

FOREIGN PATENT DOCUMENTS

EP 2975879 1/2016

OTHER PUBLICATIONS

Taiwanese Intellectual Property Office, Office action in counterpart TW application (appl. No. 106138326) dated Jun. 28, 2018. Summary in English on p. 1.

* cited by examiner

*Primary Examiner* — Chuong T Ho
(74) *Attorney, Agent, or Firm* — WPAT, PC

(57) ABSTRACT

The present invention discloses a network traffic control system capable of properly using bandwidth of a local area network (LAN). An embodiment of the system includes a master device and at least one slave device(s). The master device and the slave device(s) belong to the same LAN. The master device is configured to receive at least one flow notification packet(s) from each slave device, and determine flow allocation of the master device and each slave device according to the flow notification packet(s) and a total flow threshold. The master device is further configured to generate at least one flow control packet(s) according to the flow allocation of all the slave device(s) and transmit one or more packet(s) in accordance with the flow control packet(s) to each of the slave device(s), so that each slave device determines flow allocation of its executing network-dependent program(s) according to the one or more packet(s).

19 Claims, 4 Drawing Sheets

NETWORK TRAFFIC CONTROL DEVICE AND SYSTEM

BACKGROUND OF THE INVENTION

1. Field of the Invention

The present invention relates to a network device and a network system, especially to a network traffic control device and a network traffic control system.

2. Description of Related Art

A local area network (LAN) is common in a house or a workplace. Any two computers in the same LAN belong to the same network segment; the communication between the two computers can be carried out by broadcasting (e.g., broadcasting through a hub or a switch) without network address translation (NAT), or by one of the two computers designating the address (e.g., MAC address) of the other computer as the destination address without NAT.

Generally, in a LAN many computers share a constant bandwidth to access an external network. If one computer in the LAN consumes most of the bandwidth due to executing some program (e.g., peer-to-peer software), the other computer(s) in the LAN will be short of bandwidth.

In order to prevent a computer in a LAN from consuming too much bandwidth, some software is developed to stop a computer in a LAN from normally accessing an external network; however, this manner could be illegal or disputable. In addition, some software (hereafter "flow-control software) is developed to manage network flow; however, the flow-control software is merely capable of controlling the network flow of a single computer, so that although in a LAN a computer installing the flow-control software can control the network flow of its executing programs, other computers without the flow-control software in the same LAN still can occupy too much bandwidth.

SUMMARY OF THE INVENTION

An objective of the present invention is to provide a network traffic control device and a network traffic control system capable of preventing the problems of the prior arts.

The present disclosure includes a network traffic control system configured to manage traffic of a plurality of network devices in the same local area network (LAN). An embodiment of the system includes a master device and at least one slave device(s). The master device is configured to receive at least one flow notification packet(s) from each of the slave device(s), determine flow allocation of the master device and flow allocation of each slave device according to all the flow notification packet(s) and a total flow threshold, generate at least one flow control packet(s) according to the flow allocation of each slave device, and transmit one or more packet(s) in accordance with the flow control packet(s) to each slave device. Each slave device is configured to determine flow allocation of its executing at least one network-dependent program(s) according to the one or more packet(s).

The present disclosure also includes a network traffic control device capable of being the aforementioned master device. An embodiment of the network traffic control device is set in a LAN, and is configured to manage traffic of at least one network device(s) (e.g., slave device(s)) in the LAN. In this embodiment, the network traffic control device includes a network communication circuit and a processing circuit. The network communication circuit is configured to receive at least one flow notification packet(s) from each of the network device(s), in which the flow notification packet(s) indicate(s) at least one program flow request(s) and/or a device flow request. The processing circuit is configured to determine flow allocation of the network traffic control device and flow allocation of each of the network device(s) according to the flow notification packet(s) and a total flow threshold. In addition, the network communication circuit generates at least one flow control packet(s) according to the flow allocation of each of the network device(s) and transmits one or more packet(s) in accordance with the flow control packet(s) to each of the network device(s) so as to manage traffic of the network device(s).

The present disclosure further includes a network traffic control device capable of being the aforementioned slave device. An embodiment of the network traffic control device is set in a LAN, and is configured to follow control of a master device to manage flow allocation of each of at least one network-dependent program(s) executed by the network traffic control device. In this embodiment, the network traffic control device includes a network communication circuit and a processing circuit. The network communication circuit is configured to receive at least one flow control packet(s) from the master device, in which the flow control packet(s) include(s) flow allocation information for the network traffic control device. The processing circuit is configured to determine the flow allocation of each of the network-dependent program(s) executed by the network traffic control device according to the flow control packet(s).

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this industrial field. If any term is defined in this specification, such term should be explained accordingly.

The present disclosure includes a network traffic control device and a network traffic control system capable of using the bandwidth of a local area network (LAN) efficiently and preventing the abuse of the bandwidth. The network traffic control device is an electronic device (e.g., a desktop computer, a laptop computer, a tablet computer, a mobile phone, a smart wearable device) capable of executing network-dependent programs (i.e., programs consuming network flow). The network traffic control system includes a plurality of the network traffic control devices or the equivalent thereof; by manual setting or automatic setting in compliance with a predetermined rule, one of the network traffic control devices is treated as a master device while the other(s) is/are treated as a slave device/slave devices.

Figure 1:
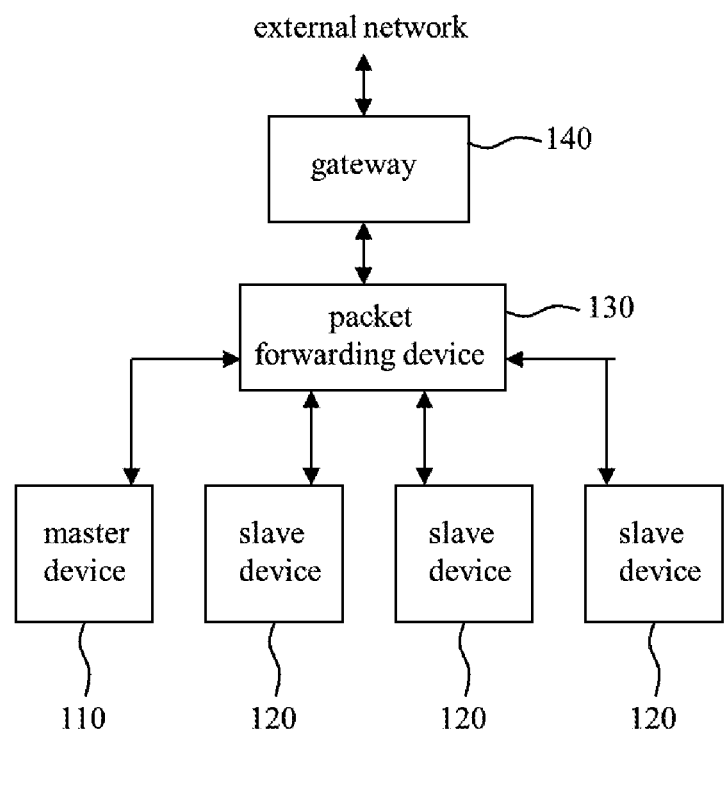
FIG. 1 shows an embodiment of the network traffic control system of the present invention.
Figure 2:
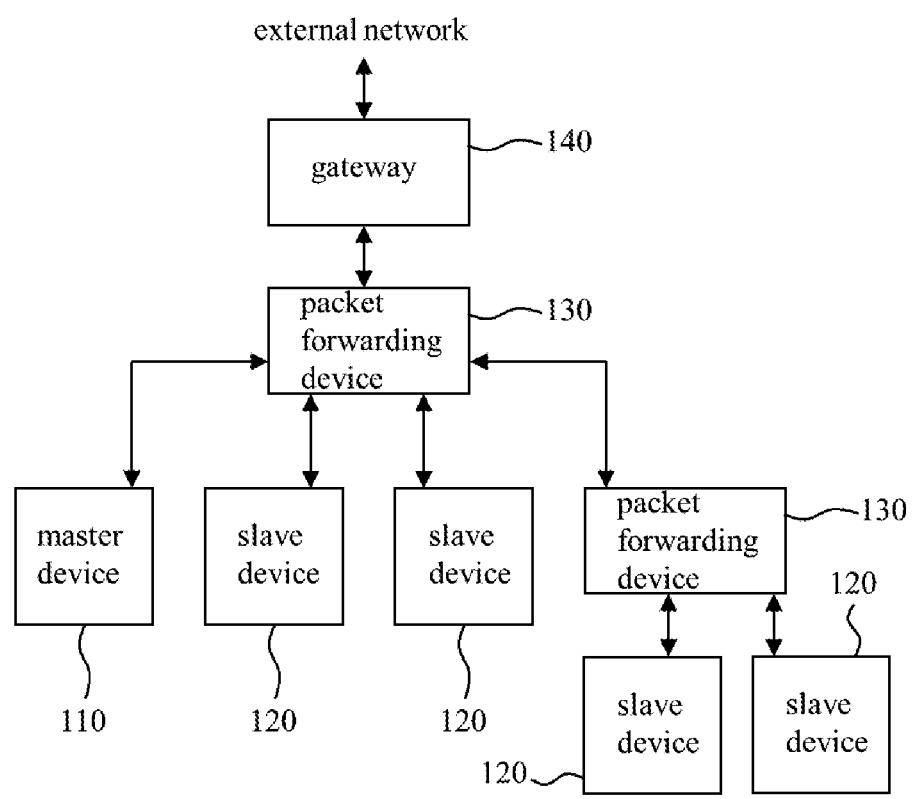
FIG. 2 shows another embodiment of the network traffic control system of the present invention.

FIG. 1 shows an embodiment of the network traffic control system of the present invention. The system is capable of managing network flow (hereafter "flow") of one or more network-dependent program(s) executed by each of the network devices in a LAN, in which the basic definition of LAN is found in the description of the related art in this specification and is well known in this industrial field. As shown in FIG. 1, the network traffic control system 100 includes a master device 110, at least one slave device(s) 120, a packet forwarding device 130 (e.g., hub, switch, router) and a gateway 140 (e.g., xDSL device). The gateway 140 is not only capable of accessing an external network but also capable of executing a packet forwarding operation; therefore the master device 110 and the slave device(s) can connect to the gateway 140 directly, and if so, the packet forwarding device 130 is optional/unnecessary. In addition, the connection between any two devices in FIG. 1 can be realized by wired connection and/or wireless connection, and this depends on the capability of the two devices and user demand. It should be noted that the configuration of network and the amount of network devices in FIG. 1 are exemplary for understanding; people of ordinary skill in the art can build another kind of network configuration (e.g., the network configuration of FIG. 2) and use the present invention in the configuration.

Please refer to FIG. 1. The master device 110 is configured to receive at least one flow notification packet(s) from each slave device 120, and determine flow allocation of the master device 110 and flow allocation of each slave device 120. The master device 100 is configured to generate at least one flow control packet(s) according to the flow allocation of each slave device 120 and transmit one or more packet(s) in accordance with the flow control packet(s) to each slave device 120. Each slave device 120 is configured to determine flow allocation of each of its executing network-dependent program(s) according to the one or more packet(s). It should be noted that the term "flow allocation of sth." is interpreted as a ration of bandwidth for a device/program.

Figure 3:
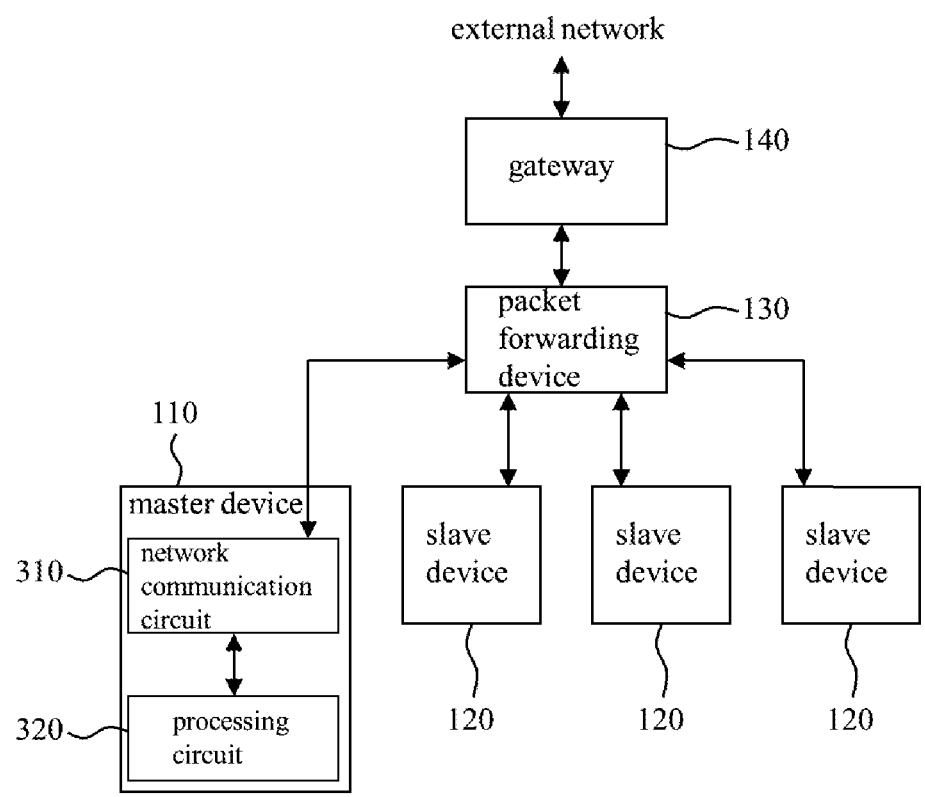
FIG. 3 shows an embodiment of the master device of FIG. 1.

FIG. 3 shows an embodiment of the master device 110 of FIG. 1. As shown in FIG. 3, the master device 110 includes a network communication circuit 310 and a processing circuit 320. The network communication circuit 310 is a network interface controller (NIC) or the equivalent thereof. An embodiment of the NIC is an Ethernet NIC or a wireless NIC; both of the Ethernet NIC and the wireless NIC are well known in this industrial field. The network communication circuit 310 is configured to receive the aforementioned at least one flow notification packet(s) from each slave device 120, and the flow notification packet(s) include(s) information indicating at least one program flow request(s) of the slave device 120 and/or indicating a device flow request of the slave device 120; for instance, the network communication circuit 310 receives one flow notification packet from a first device of the slave devices 120, and this flow notification packet includes information indicating at least one program flow request(s) (e.g., the flow request(s) of at least one of the follows: a game program, an on-line video program, a webpage browsing program and a data transport program executed by the first device) and/or indicating a device flow request of the first device; for another instance, the network communication circuit 310 receives different flow notification packets from a first device of the slave devices 120, in which these different flow notification packets respectively indicate flow requests of different network-dependent programs executed by the first device. In an exemplary implementation of the network traffic control system 100 of FIG. 3, the network communication circuit 310 regularly or irregularly transmits at least one flow-inquiry packet(s) to each slave device 120 so as to ask each slave device 120 to transmit its flow notification packet(s). In another exemplary implementation of the network traffic control system 100, each slave device regularly or irregularly transmits its flow notification packet(s) without the asking of the master device 110.

Please refer to FIG. 3. The processing circuit 320 is a circuit (e.g., a single circuit such as a CPU or a combination of several circuits) capable of executing network-dependent programs, and the processing circuit 320 is configured to determine the flow allocation of the master device 110 and the flow allocation of each slave device 120 according to the flow notification packet(s) from each slave device 120 and a total flow threshold (e.g., a threshold including a total upload threshold and a total download threshold). For instance, the processing circuit 320 determines the program flow allocation of each network-dependent program executed by the master device 110 and determines the program flow allocation of each network-dependent program (identified by the flow notification packet(s)) executed by each slave device 120. For another instance, the processing circuit 320 determines the device flow allocation of each slave device 120 which thereby determines the flow allocation of its executing network-dependent program(s) according to its device flow allocation. After the processing circuit 320 determines the flow allocation, the network communication circuit 310 generates at least one flow control packet(s) according to the flow allocation of each slave device 120 and then transmits one or more packet(s) (i.e., the flow control packet(s) or the derivative thereof) in accordance with the flow control packet(s) to each slave device 120 in the manner of broadcasting or specifying at least one destination(s), so as to control the flow of each slave device 120. For instance, the network communication circuit 310 generates a single flow control packet according to the flow allocation of each slave device 120 and then transmits this flow control packet to each slave device 120, in which the flow control packet includes the flow allocation information (e.g., program flow allocation information or device flow allocation information) for each slave device 120. For another instance, the network communication packet 310 generates different flow control packets according to the flow allocation of each slave device 120 and then transmits these different flow control packets to the slave devices 120 respectively, in which the different flow control packets are used to control the flow of different slave devices 120 respectively. It should be noted that the processing circuit 320 and the network communication circuit 310 could be two separated circuits or integrated into one single circuit.

Please refer to FIG. 3. The aforementioned total flow threshold is the network bandwidth for the system 100 accessing an external network. The total flow threshold could be set by a user, could be manually/automatically determined according to the detection of a known or a self-developed bandwidth detecting software, or could be set by the processing circuit 320. When the total flow threshold is set by the processing circuit 320, the processing circuit 320 can adopt an automatically learning algorithm to determine or update the total flow threshold according to the flow request of each network-dependent program executed by the master device 110 and according to the flow request(s) of all the flow notification packet(s), in which an example of the automatically learning algorithm is a known algorithm allowing the processing circuit 320 to determine or update the total flow threshold according to the maximum among the flow requests of the master device 110 and the slave device(s) 120. In an exemplary implementation, the overall flow allocation for the master device 110 and all the slave device(s) 120 is not greater than the total flow threshold. In an exemplary implementation, the total flow allocation of the master device 110 is not less than the total flow allocation of any slave device 120.

In an exemplary implementation, the aforementioned flow notification packet(s) of each slave device 120 further include(s) information indicating device priority demand which allows the slave device 120 (i.e., the one sending the flow notification packet(s)) to use the bandwidth preferentially. Each device priority demand can be set by a user of the slave device 120 sending this device priority demand, or can be automatically set by the slave device 120 in accordance with a priority decision algorithm; for instance, the higher the network transmission speed that a slave device 120 is capable of working at, the higher the device priority demand of this slave device 120. When the setting of the device priority demand of a slave device 120 is high, the slave device 120 requests for additional flow allocation. In an exemplary implementation, the aforementioned flow notification packet(s) of a first device of the slave devices 120 include(s) device vendor information such as the vendor information of the NIC of the first device, and if the device vendor information is prescribed vendor information, the processing circuit 320 gives additional flow allocation to the first device. In an exemplary implementation, the processing circuit 320 determines the flow allocation of the programs respectively executed by the master device 110 and the slave device(s) 120 according to all the flow notification packet(s), the total flow threshold and program priority setting of the said programs; for instance, the program priority setting includes priority setting of a game program, and if the program(s) executed by the master device 110 and/or the slave device 120 include(s) the game program, the processing circuit 320 determines the flow allocation for the game program according to the priority setting of the game program so as to allow the game program to gain enough flow allocation and run smoothly.

Figure 4:
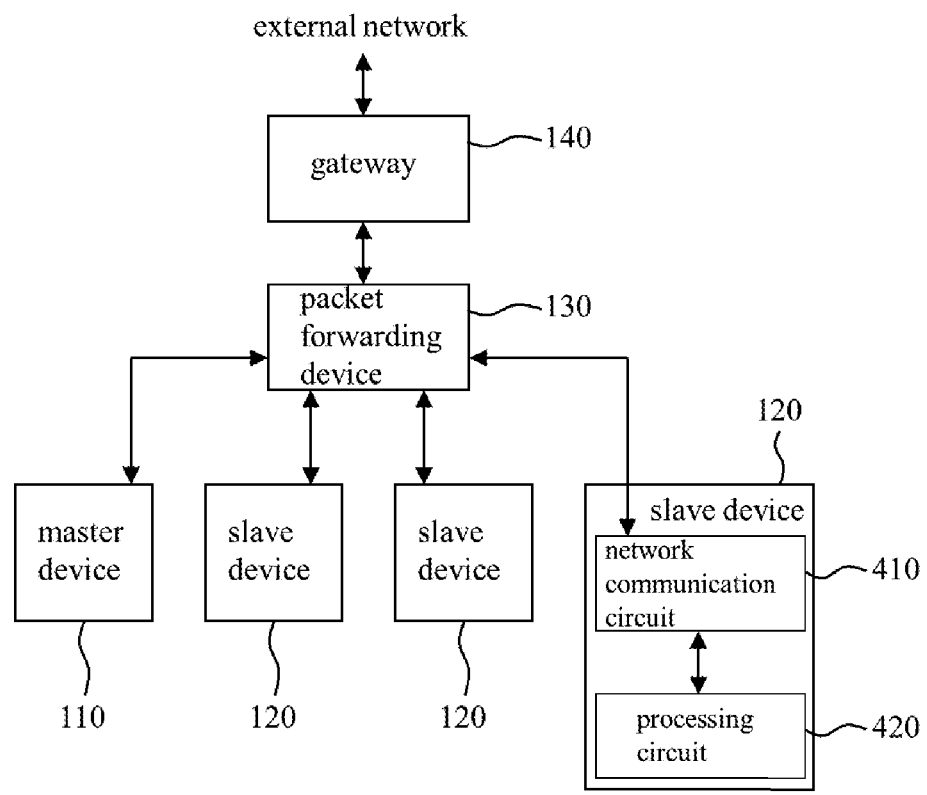
FIG. 4 shows an embodiment of the slave device of FIG. 1.

FIG. 4 shows an embodiment of a slave device 120. As shown in FIG. 4, the slave device 120 includes a network communication circuit 410 and a processing circuit 420. The network communication circuit 410 is a NIC or the equivalent thereof, and is configured to receive at least one flow control packet(s) from the master device 110. The flow control packet(s) include(s) flow allocation information for the slave device 120 (e.g., the device flow allocation for the slave device 120, or the program flow allocation for each network-dependent program executed by the slave device 120). The processing circuit 420 is a circuit (e.g., a single circuit or a combination of several circuits) capable of executing programs (e.g., application software or programs of an operating system), and is configured to determine the flow allocation of each network-dependent program executed by the slave device 120 including the processing circuit 420.

Since those of ordinary skill in the art can appreciate the detail and the modification of the embodiment of FIG. 4 by referring to the aforementioned embodiments, which means that the features of the aforementioned embodiments can be applied to the embodiment of FIG. 4 in a reasonable way, repeated and redundant description having little to do with understanding and enablement of the embodiment of FIG. 4 is omitted here.

It should be noted that the flow request(s) of the master device 110 or the flow request(s) of each slave device(s) 120 can be generated by the master device 110/the slave device 120 using a known or a self-developed flow statistical technique; the generation, the transmission and the reception of each of the aforementioned packets is well known in this industrial field; and at least one of the master device 110 and the slave device(s) 120 can be equipped with a user interface so that a user can manually set the flow allocation, the priority, etc. for a device/program by the user interface, in which the way to provide the user interface and the way to control a device through the user interface can be realized in known or self-developed techniques. It should be noted that people of ordinary skill in the art can implement the present invention by selectively using some or all of the features of any embodiment in this specification or selectively using some or all of the features of two or more embodiments in this specification as long as such implementation is practicable, which implies that the present invention can be carried out flexibly.

As described in the preceding paragraph, according to a predetermined rule one of the network traffic control devices can be automatically treated as the master device while the other(s) can be treated as the slave device(s). The predetermined rule could be a Master Queue First Decision Mechanism, a Master Stack First Decision Mechanism, a Master Weights First Decision Mechanism or a Master Client Voting First Decision Mechanism. These mechanisms are explained as follows:

(1) Master Queue First Decision Mechanism: This mechanism adopts a First In First Out algorithm. In a LAN, when a device "A" capable of being a master device is turned on, the device "A" will broadcast a notice in the LAN and search for any other device in the LAN capable of being a master device (hereafter "qualified master device"). If no qualified master device is found in the LAN, the device "A" will label itself as "Master$^1$", in which the word "Master" of "Master$^1$" stands for a qualified master device and the ordinal number "1" of "Master$^1$" stands for the ranking of being the master device; in this case the device "A" labeled as "Master$^1$" is treated as the master device in the LAN. On the other hand, if N qualified master device(s) is/are found in the LAN, the device "A" will label itself as "Master$^{N+1}$", in which N is a positive integer. For instance, if the device "A" finds three qualified master devices in the LAN, the device "A" will label itself as "Master$^4$". When the device "A" acting as the master device is going to be turned off, the device "A" will broadcast a notice in the LAN to inform the other qualified master device(s) of its being turned off; when the other qualified master device(s) receive(s) the notice, each of the qualified master device(s) having a ranking higher than the ranking of the device "A" will subtract one from the ordinal number of its label. If the ordinal number of some qualified master device is "1" after the subtraction, this qualified master device will be treated as the master device. If none of the ordinal number(s) of the qualified master device(s) is "1" after the subtraction, the original master device in the LAN is still treated as the master device. If none of the devices in the LAN is labeled as "Master$^1$" after a predetermined period of time while there is one or more qualified master device(s) in the LAN, each qualified master device in the LAN will subtract one from its ordinal number. If none of the devices in the LAN is labeled as "Master$^1$" after a predetermined period of time while there is no qualified master device in the LAN, each slave device in the LAN will no longer transmit the flow notification packet(s), and will transmit a packet to search for a master device after a predetermined period of time.

(2) Master Stack First Decision Mechanism: This mechanism adopts a First In Last Out algorithm. In a LAN, when a device "A" being a qualified master device is turned on, the device "A" will broadcast a notice in the LAN and search for any other qualified master device(s) in the LAN. If no qualified master device is found in the LAN, the device "A" will label itself as "Master$^1$". On the other hand, if there is any other qualified master device(s) in the LAN, each qualified master device will add one to its ordinal number after receiving the notice from the device "A" and then inform the device "A" of the change of the ordinal number by sending a label-change-notice packet to the device "A"; consequently, the device "A" will label itself as "Master$^1$" after receiving the label-change-notice packet(s) from the other qualified master device(s) and then act as the master device. When the device "A" acting as the master device is going to be turned off, the device "A" will broadcast a notice in the LAN to inform the other qualified master device(s) of its being turned off; when the other qualified master device(s) receive(s) the notice, the qualified master device(s) having a ranking higher than the ranking of the device "A" will subtract one from its ordinal number. If the ordinal number of some qualified master device is one (i.e., "1") after the subtraction, this qualified master device will act as the master device. If none of the ordinal number(s) of the qualified master device(s) is one after the subtraction, the original master device in the LAN is still treated as the master device. If none of the devices in the LAN is labeled as "Master$^1$" after a predetermined period of time while there is one or more qualified master device(s) in the LAN, each qualified master device in the LAN will subtract one from its ordinal number. If none of the devices in the LAN is labeled as "Master$^1$" after a predetermined period of time while there is no qualified master device in the LAN, each slave device in the LAN will no longer transmit the flow notification packet(s), and will transmit a packet to search for a master device after a predetermined period of time.

(3) Master Weights First Decision Mechanism: This mechanism adopts a performance-weight algorithm. In a LAN, after a device "A" being a qualified master device is turned on, the device "A" will calculate its weight according to at least one of a CPU's grade, a memory's grade, a graphic card's grade and a hard disk's grade; thereafter, the device "A" will broadcast a notice in the LAN and search for any other qualified master device in the LAN. If no qualified master device is found in the LAN, the device "A" will label itself as "Master$^1$". On the other hand, if one or more qualified master device(s) is/are found in the LAN, each qualified master device will transmit a packet to the device "A" to have the device "A" be aware of the amount of the other qualified master device(s) in the LAN; afterward, the device "A" transmits a weight notification packet to the other qualified master device(s) so that each of the qualified master device(s) can compare its weight with the weight of the device "A"; therefore, if the weight of one qualified master device is greater than the weight of the device "A", this qualified master device will subtract one from its ordinal number and inform the device "A" of its ranking (e.g., its ordinal number), and if the weight of one qualified master device is less than the weight of the device "A", this qualified master device will add one to its ordinal number and inform the device "A" of its ranking. When the device "A" finishes collecting all the ranking(s) of the other qualified master device(s) in the LAN, the device "A" knows the amount and the ranking(s) of these qualified master device(s) in the LAN, and then labels itself with an unused label. When the device "A" acting as the master device is going to be turned off, the device "A" will broadcast a notice in the LAN to inform the other qualified master device(s) of its being turned off; when the other qualified master device(s) receive(s) the notice, the qualified master device(s) having a ranking higher than the ranking of the device "A" will subtract one from its ordinal number. If the ordinal number of some qualified master device is one after the subtraction, this qualified master device will act as the master device in the LAN; and if none of the ordinal number(s) of the qualified master device(s) is one after the subtraction, the original master device in the LAN is still treated as the master device. If none of the devices in the LAN is labeled as "Master$^1$" after a predetermined period of time while there is one or more qualified master device(s) in the LAN, each qualified master device in the LAN will subtract one from its ordinal number. If none of the devices in the LAN is labeled as "Master$^1$" after a predetermined period of time while there is no qualified master device in the LAN, each slave device in the LAN will no longer transmit the flow notification packet(s), and will transmit a packet to search for a master device after a predetermined period of time.

(4) Master Client Voting First Decision Mechanism: This mechanism adopts a master-client decision algorithm. In a LAN, after a device "A" being a qualified master device is turned on, the device "A" will broadcast a notice in the LAN and search for any other qualified master device in the LAN. If no qualified master device is found in the LAN, the device "A" will label itself as "Master$^1$". On the other hand, if there is any other qualified master device(s) in the LAN, each of the qualified master device(s) will inform the device "A" of its existence by sending a packet to the device "A" so that the device "A" can be aware of the amount of the other qualified master device(s) in the LAN; afterward, the device "A" transmits a master-client swap packet to each qualified master device(s) and each slave device(s) in the LAN to inform them of its existence and ask them whether the device "A" is allowed to be the master device in the LAN. If the responses of the other qualified master device(s) to the master-client swap packet show that the amount of positive vote(s) is greater than the amount of negative vote(s), the device "A" will label itself as "Master$^1$" and inform the other qualified master device(s) and the slave device(s) of the device "A" being the master device, while the other qualified master device(s) will add one to its ordinal number. If the amount of the positive vote(s) is fewer than the amount of the negative vote(s), the device "A" will label itself as "Master$^X$", in which the ordinal number "X" is equal to the amount of all the qualified master devices including the device "A" in the LAN. If the amount of positive vote(s) is equal to the amount of negative vote(s), the device "A" will label itself as "Master$^2$" and transmit a label-revision packet to the other qualified master device(s) so as to have the qualified master device(s) having the ordinal number not less than two add one to the ordinal number. If in a predetermined period of time both the amount of positive vote(s) and the amount of negative vote(s) are zero, the device "A" will label itself as "Master$^X$". When the device "A" acting as the master device is going to be turned off, the device "A" will broadcast a notice in the LAN to inform all the other device(s) of its being turned off; when the other qualified master device(s) receive(s) the notice, the qualified master device(s) having a ranking higher than the ranking of the device "A" will subtract one from its ordinal number. If the ordinal number of some qualified master device is one after the subtraction, this qualified master device will act as the master device in the LAN; and if none of the ordinal number(s) of the qualified master device(s) is one after the subtraction, the original master device in the LAN is still treated as the master device. If none of the devices in the LAN is labeled as "Master$^1$" after a predetermined period of time while there is one or more qualified master device(s) in the LAN, each qualified master device in the LAN will subtract one from its ordinal number. If none of the devices in the LAN is labeled as "Master$^1$" after a predetermined period of time while there is no qualified master device in the LAN, each slave device in the LAN will no longer transmit the flow notification packet(s), and will transmit a packet to search for a master device after a predetermined period of time.

To sum up, the present invention is capable of managing the flow of network-dependent program(s) executed by each network device in a LAN, so as to use the bandwidth of the LAN smartly and prevent some network device in the LAN from consuming too much bandwidth.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A network traffic control device configured to manage traffic of at least one network device(s) in a local area network (LAN), the network traffic control device belonging to the LAN and comprising:
   a network communication circuit configured to receive at least one flow notification packet(s) from each of the network device(s), in which the flow notification packet(s) indicate(s) at least one program flow request (s) and/or a device flow request; and
   a processing circuit configured to determine flow allocation of the network traffic control device and flow allocation of each of the network device(s) according to the flow notification packet(s) and a total flow threshold,
   in which the network communication circuit generates at least one flow control packet(s) according to the flow allocation of each of the network device(s) and transmits one or more packet(s) in accordance with the flow control packet(s) to each of the network device(s) so as to manage traffic of the network device(s).

2. The network traffic control device of claim 1, wherein the network communication circuit transmits at least one flow-inquiry packet(s) to each of the network device(s) so as to ask each of the network device(s) to transmit the flow notification packet(s).

3. The network traffic control device of claim 1, wherein the flow notification packet(s) from a first device of the network device(s) indicate(s) a device priority demand which allows the first device to request for additional flow allocation.

4. The network traffic control device of claim 1, wherein the processing circuit determines or updates the total flow threshold according to at least one program flow request(s) of the network traffic control device and according to the flow notification packet(s).

5. The network traffic control device of claim 1, wherein the processing circuit determines or updates the total flow threshold according to a master-device maximum flow request among flow requests of network-dependent programs executed by the network traffic control device and according to a slave-device maximum flow request among flow requests of network-dependent programs executed by the network device(s).

6. The network traffic control device of claim 1, wherein the processing circuit determines flow allocation of at least one network-dependent program(s) executed by the network traffic control device and flow allocation of at least one network-dependent program(s) executed by each of the network device(s) according to the flow notification packet(s) and the total flow threshold.

7. The network traffic control device of claim 6, wherein the processing circuit determines the flow allocation of the network-dependent program(s) executed by the network traffic control device and the flow allocation of the network-dependent program(s) executed by each of the network device(s) according to the flow notification packet(s), the total flow threshold and program priority setting.

8. The network traffic control device of claim 1, wherein the flow allocation of a first device of the network device(s) is device flow allocation.

9. The network traffic control device of claim 8, wherein a first device of the network device(s) determines flow allocation of at least one network-dependent program(s) executed by the first device according to the device flow allocation.

10. The network traffic control device of claim 1, wherein the flow notification packet(s) further indicate(s) device vendor information.

11. A network traffic control device configured to follow control of a master device and thereby manage flow allocation of each of at least one network-dependent program(s) executed by the network traffic control device, the network traffic control device and the master device belonging to a local area network (LAN), the network traffic control device comprising:
    a network communication circuit configured to receive at least one flow control packet(s) from the master device, in which the flow control packet(s) include(s) flow allocation information for the network traffic control device; and
    a processing circuit configured to determine the flow allocation of each of the network-dependent program(s) according to the flow control packet(s),
    wherein the processing circuit determines the flow allocation of each of the network-dependent program(s) according to the flow control packet(s) and program priority setting.

12. The network traffic control device of claim 11, wherein the network communication circuit transmits at least one flow notification packet(s) to the master device without asking of the master device so as to actively ask the master device to transmit the flow control packet(s).

13. The network traffic control device of claim 11, wherein the network communication circuit transmits at least one flow notification packet(s) to the master device in response to at least one flow-inquiry packet(s) of the master device so as to passively ask the master device to transmit the flow control packet(s).

14. The network traffic control device of claim 11, wherein the flow allocation information includes individual flow allocation information for each of the network-dependent program(s) or includes device flow allocation information for the network traffic control device.

15. A network traffic control system configured to manage traffic of a plurality of network devices including a master device and at least one slave device(s) in a local area network (LAN), the network traffic control system comprising:
- the master device configured to receive at least one flow notification packet(s) from each of the slave device(s), determine flow allocation of the master device and flow allocation of each of the slave device(s) according to the flow notification packet(s) and a total flow threshold, generate at least one flow control packet(s) according to the flow allocation of each of the slave device(s), and transmit one or more packet(s) in accordance with the flow control packet(s) to each of the slave device(s); and
- the slave device(s), each of which configured to determine flow allocation of at least one network-dependent program(s) according to the one or more packet(s).

16. The network traffic control system of claim 15, wherein the master device transmits at least one flow-inquiry packet(s) to each of the slave device(s) so as to ask each of the slave device(s) to transmit the flow notification packet(s).

17. The network traffic control system of claim 15, wherein the flow allocation of each of the slave device(s) is device flow allocation.

18. The network traffic control system of claim 17, wherein each of the slave device(s) determines the flow allocation of the network-dependent program(s) according to the device flow allocation.

19. The network traffic control system of claim 15, wherein the flow notification packet(s) indicate(s) device vendor information.

\* \* \* \* \*